United States Patent Office 3,150,209

Patented Sept. 22, 1964

1

2

3,150,209

COMPOSITIONS FROM TERMINALLY REACTIVE POLYMERS

James N. Short and Charles C. Bice, Bartlesville, Okla., assignors to Phillips Petroleum Company, a corporation of Delaware No Drawing. Filed May 15, 1961, Ser. No. 109,863
12 Claims. (Cl. 260—894)

This invention relates to a method of preparing polymeric products from terminally reactive polymers. In another aspect it relates to a method of plasticizing a terminally reactive polymer and to the resulting cured product.

In the copending application, Serial No. 772,167, of Uraneck, Short, Hsieh and Zelinski, filed November 6, 1958, it is disclosed that highly useful polymeric products can be obtained by polymerizing vinylidene-containing monomers in the presence of an organo alkali metal catalyst and subsequently reacting the resulting polymer containing alkali metal end groups with a reagent which replaces the alkali metal with more stable reactive end groups. These polymers can then be cured by reaction with polyfunctional organic compounds reactive with the end groups of the polymer. The reactive terminal substituents on the polymer molecules enable a more effective cure since all of the polymer molecule can be tied into the cross-linked structure. The term "telechelic" has been coined to define these terminally reactive polymers and, as used in this specification, the term "telechelic polymer" means a polymer of vinylidene-containing monomers which contains a reactive group upon each end of the polymer molecule. Expressed in another way the telechelic polymers contain at least 2 terminal reactive groups per molecule. The term "semi-telechelic" is used to refer to a polymer which has a functional group upon only 1 end of the polymer molecule.

Telechelic polymers have a number of outstanding attributes, one of which being the ease with which the polymer can be molded. Liquid telechelic polymers are readily castable and can be converted into solids on reaction of the polymer with a polyfunctional compound. Soft tacky rubbers can be readily extruded and cured to form products which are quite rigid. It is frequently desirable to plasticize such a polymer in order to obtain greater flexibility in fabricating techniques and conditions. For example, by making a polymer more fluid substantially larger amounts of filler can be incorporated into the polymer prior to curing. One of the disadvantages, however, of using a plasticizer for products of this type is that plasticizers have a tendency to bleed from or migrate within the polymeric structure, either changing the characteristics of the cured product or damaging adjacent materials such as a bonding agent in laminates of such a composition.

According to our invention a method is provided for plasticizing a polymer of vinylidene-containing monomer, said polymer containing at least about 2 terminally reactive groups per molecule, in order to improve the processibility of the polymer during fabrication without introducing the problem of bleeding or migration of the plasticizer in the cured product. We have discovered that such a telechelic polymer can be plasticized if the plasticizing agent is a second polymer of vinylidene-containing monomers, said second polymer containing only 1 terminal functional group per molecule and the polyfunctional curing agent is an agent which contains at least 2 functional groups which are reactive with the reactive groups on both the telechelic polymer and the plasticizer. Preferably the single functional group on the plasticizing polymer is of the same type as employed in the telechelic polymer. While we do not wish to be bound by theory on the mechanism of reaction, it is believed that one end of the plasticizer is tied into the cross-linked structure of the telechelic polymer and the polyfunctional organic coupling agent and the other end of the polymer remains free to serve as a plasticizer in the cured product to improve its flexibility and elongation over long periods and particularly at low temperatures. Since the plasticizer is fixed at one end to the cross-linked structure of the cured composition there is substantially no tendency for the plasticizer to bleed or migrate within the composition, even when subjected to agents which would ordinarily extract such a plasticizer. The advantages of such a product in common household items such as shower curtains, table cloths, raincoats and the like are believed apparent.

It is an object of our invention to provide an improved polymer composition from terminally reactive polymers. Another object is to provide an improved method of plasticizing a polymer of vinylidene-containing monomers having at least 2 terminally reactive groups per molecule prior to curing the polymer with a polyfunctional organic coupling agent. Another object is to provide an improved cured product from terminally reactive polymers which has been plasticized with a relative low viscosity polymer which has substantially no tendency to bleed from the cured composition. Other objects and advantages and features of our invention will be apparent to those skilled in the art from the following discussion.

The telechelic polymers which are plasticized according to our invention can be obtained by polymerizing vinylidene-containing monomers in the presence of an organo alkali metal catalyst and subsequently reacting the resulting polymer containing active alkali metal end groups with a reagent which replaces these alkali metal groups with more stable functional groups. The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following:

1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
3-butyl-1,3-octadiene,
3,4-dimethyl-1,3-hexadiene,
3-n-propyl-1,3-pentadiene,
4,5-diethyl-1,3-octadiene,
phenyl-1,3-butadiene,
2,3-diethyl-1,3-butadiene,
2,3-di-n-propyl-1,3-butadiene,
2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of our invention and preferred monomers are butadiene, isoprene and piperylene.

In addition to the conjugated dienes we can practice our invention with other monomers containing a $CH_2=C<$ group such as the vinyl-substituted aromatic compounds. The vinyl-substituted aromatic compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include:

3-methylstyrene,
(3-vinyltoluene),
3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzyl-styrene,
4-p-tolylstyrene,
3,5-diphenylstyrene,
2,4,6-tri-tert-butylstyrene,
2,3,4,5-tetramethylstyrene,
4-(4-phenyl-n-butyl)styrene,
3-(4-n-hexylphenyl)styrene,
4-methoxystyrene,
3,5-diphenoxystyrene,
3-decoxystyrene,
2,6-dimethyl-4-hexoxystyrene,
4-dimethylaminostyrene,
3,5-diethylaminostyrene,
4-methoxy-6-di-n-propylaminostyrene,
4,5-dimethyl-1-vinylnaphthalene,
3-ethyl-1-vinylnaphthalene,
6-isopropyl-1-vinylnaphthalene,
2,4-diisopropyl-1-vinylnaphthalene,
3,6-di-p-tolyl-1-vinylnaphthalene,
6-cyclohexyl-1-vinylnaphthalene,
4,5-diethyl-8-octyl-1-vinylnaphthalene,
3,4,5,6-tetramethyl-1-vinylnaphthalene,
3,6-di-n-hexyl-1-vinylnaphthalene,
8-phenyl-1-vinylnaphthalene,
5-(2,4,6-trimethylphenyl)-1-vinylnaphthalene,
3,6-diethyl-2-vinylnaphthalene,
7-dodecyl-2-vinylnaphthalene,
4-n-propyl-5-n-butyl-2-vinylnaphthalene,
6-benzyl-2-vinylnaphthalene,
3-methyl-5,6-diethyl-8-n-propyl-2-vinylnaphthalene,
4-o-tolyl-2-vinylnaphthalene,
5-(3-phenyl-n-propyl)-2-vinylnaphthalene,
4-methoxy-1-vinylnaphthalene,
6-phenoxy-1-vinylnaphthalene,
3,6-dimethylamino-1-vinylnaphthalene,
7-dihexoxy-2-vinylnaphthalene, and the like.

These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block copolymers with conjugated dienes and/or vinyl-substituted aromatic compounds. When preparing these block copolymers the polar monomer is introduced after the non-polar monomers have polymerized. A detailed description of block copolymers containing terminal reactive groups and their method of preparation is set forth in the copending application of R. P. Zelinski, Serial No. 796,277, March 2, 1959. These polar monomers include vinylpyridines and vinylquinolines in which the vinyl group is attached to a ring carbon other than a carbon in the beta position with respect to the nitrogen. These pyridines, quinolines or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include:

2-vinylpyridine,
4-vinylpyridine,
3,5-diethyl-4-vinylpyridine,
5-methyl-2-vinylpyridine,
5-n-octyl-2-vinylpyridine,
3-n-dodecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinoline,
4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 2 to 4 alkali metal atoms, and those containing 2 alkali metal atoms are more often employed. As will be explained hereinafter, lithium is the preferred alkali metal.

The organo alkali metal compound can be prepared in several ways, for example, by replacing halogens in an organic halide with alkali metals, by direct addition of alkali metals to a double bond, or by reacting an organic halide with a suitable alkali metal compound. The reaction diluent for preparation of the initiator is preferably an ether, such as diethyl ether.

The organo alkali metal compound initiates the polymerization reaction, the organo radical being incorporated in the polymer chain and the alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 2 to 4.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 2 to 4. The R in the formula generally contains from 1 to 20 carbon atoms although it is within the scope of the invention to use higher molecular weight compounds. By far the best results are obtained with organo lithium compounds, which give very high conversions to the polymerization initiator. Examples of polyalkali metal substituted hydrocarbons which can be employed for the polymerization initiator include 1,4-dilithiobutane,
1,5-dipotassiopentane,
1,4-disodio-2-methylbutane,
1,10-dilithiodecane,
1,20-dilithioeicosane,
1,4-dilithio-2-methyl-2-butane,
dilithionaphthalene,
dilithioanthracene,
1,2-dilithio-1,2-diphenylethane,
1,4-dilithiocyclohexane,
1,3,5-trilithiocyclohexane,
1,2-di(lithiobutyl)benzene,
1,3-dilithio-4-ethylbenzene,
1,4-dirubidiobutane,
1,8-dicesiooctane,
1,5-dilithio-3-pentyne,
1,10-dicesio-4-decyne,
dilithiophenanthrene,
dilithiomethane, and the like.

Certain specific initiators give better results than others and are preferred in carrying out preparations of the terminally reactive polymers. Lithium adducts of naphthalene, methylnaphthalenes, and anthracene give very good results. A preferred initiator is 1,2-dilithio-1,2-diphenylethane (lithium-stilbene adduct). Other preferred initiators for the formation of telechelic polymers are the dilithium adducts of 2,3-dialkyl-1,3-butadiene, e.g., 2,3-dimethyl-1,3-butadiene and especially the dilithium adduct of butadiene or isoprene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semisolid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent which is predominantly hydrocarbon, such as, benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

While the telechelic polymer can be prepared from any of the above mentioned monomers it is preferred that the polymer contain at least a major amount of conjugated diene and homopolymers of conjugated dienes are still more preferred. Polymers which are either liquid, semisolid or solid can be plasticized to advantage according to our invention. The invention is particularly applicable, however, in lowering the viscosity of liquid polymers in order that higher amounts of fillers can be incorporated therein prior to curing. By filler we refer to those granular solid materials which are normally used as pigments, fillers, or reinforcing agents in polymeric or rubbery stocks. Most typical of these is carbon black, although a wide variety of mineral fillers is frequently employed, such as silica, titanium dioxide, zinc oxide, calcium carbonate, zinc sulfide, calcium silicate, hydrated alumina, calcined magnesia, and various types of clays. Filler loadings can vary over a wide range, for example, between about 20 to 500 parts or higher of filler per 100 parts of polymer including both the telechelic polymer and the semi-telechelic plasticizing agent.

The semi-telechelic plasticizing agent can be prepared from any of the monomers enumerated above for the preparation of the telechelic polymers although, as stated in connection with the telechelic polymers, the polymers of conjugated dienes, at least in major amount, are preferred. Ordinarily the conjugated dienes employed for the plasticizer are those containing 4 to 8 carbon atoms per molecule and those containing from 4 to 6 carbon atoms are preferred. These polymers can be prepared by the procedure described in connection with the telechelic polymers using a mono-alkali metal organo initiator rather than the di- or poly-alkali metal initiators listed for preparation of the telechelic polymers. Examples of these mono-alkali metal substituted hydrocarbons include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, and the like. Of these, n-butyllithium is the preferred initiator. In preparing these plasticizers polar solvent should be held to a minimum, or preferably eliminated, during the polymerization process. The viscosity of the plasticizers should be in the range of about 10 to 500 poises at 77° F. and we prefer to practice the invention with plasticizers having a viscosity in the range of 20 to 400 poises. Such plasticizers are very effective in plasticizing more viscous, telechelic polymers which have a viscosity of about 500 to 3000 poises at 77° F. The telechelic polymer is normally employed in amounts ranging from 25 to 95 parts by weight per 100 parts of the total polymeric mixture while the semi-telechelic plasticizer is employed in amounts ranging from 5 to 75 parts per 100 parts of the total polymeric composition. Preferably the invention is practiced with from 75 to 95 parts by weight of the telechelic polymer and from 5 to 25 parts of the semi-telechelic plasticizer per 100 parts of total mixture exclusive of other materials which may be present such as fillers, pigments, auxiliary curatives, antioxidants or the like.

At the end of the polymerization the telechelic or semi-telechelic polymers contain an alkali metal atom on both ends or one end, respectively, of the polymer chain and the organic radical of the initiator is present in the polymer chain. These reactive polymers are then treated with reagents to introduce various reactive groups in place of the alkali metal atoms. While these alkali metal atoms themselves are reactive they are relatively unstable since in the presence of moisture they are rapidly converted to produce polymers containing an inactive hydrogen in place of the alkali metal. Various reagents can be used to place reactive groups on the ends of the polymer molecule thereby producing stable telechelic polymers which can be conveniently processed and cured at the most opportune time. A wide variety of reactive groups is possible in the telechelic polymers of this type. One of the most practical classes of terminally reactive groups contains reactive hydrogen, for example, hydrogen attached to oxygen, sulfur or nitrogen. Examples of such groups containing reactive hydrogen include:

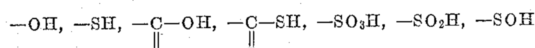

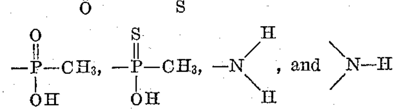

Other such end groups include phosphinic or thiophosphinic acid end groups and other acidic groups such as POOH, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$. Examples of other reactive groups are those containing a reactive halogen in which the halogen is attached to carbon or sulfur with the carbon carrying the halogen being singly bonded to oxygen or sulfur, multiply bonded to oxygen or sulfur or alpha to a carbonyl group, a thiono group

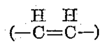

or an ethylene group $$(-\overset{H}{C}=\overset{H}{C}-)$$

Examples of end groups of this type include:

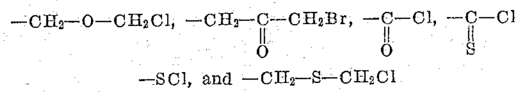

Examples of other reactive end groups are those containing reactive double or triple bonds, for example, an oxygen, sulfur or nitrogen attached to carbon by a multiple bond. Examples of these reactive groups include:

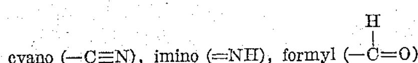

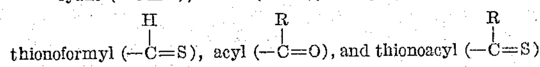

wherein R is a hydrocarbon radical.

A number of different methods can be used to substitute reactive groups of the above type for the alkali metal atoms on the ends of the polymer chain. For example, the alkali metal telechelic polymer can be reacted with carbon dioxide and thereafter with an acid such as hydrogen chloride to produce a polymer containing terminal carboxy groups. Sulfuryl chloride can be used to produce polymers containing terminal $SO_3H$ groups. Other reactants which can be employed to replace the alkali metal atoms with reactive groups are carbon disulfide, sulfur dioxide, disodium chlororesorcinate, acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexylacetonitrile, benzonitrile, p-methyl benzonitrile, ethyl isocyanide, n-butyl isocyanide, n-decyl isocyanide, 2-(4-methylcyclohexyl)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene, ethylketene, phenylketene, cyclohexylketene, and the like. Cyclic disulfides can be employed to prepare mercapto telechelic polymers and phosphonic dihalides or thionophosphonic dihalides can be employed to prepare the polymers containing terminal phosphonic or thionophosphinic acid end groups. Epoxy compounds can be employed to prepare polymers containing terminal hydroxy groups, and polymers containing terminal alkali metal atoms can be reacted with compounds containing the structure

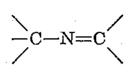

to prepare polymers containing terminal nitrogen groups which are active in quaternizing reactions.

These telechelic polymers prepared as described above can be characterized as containing at least about 2 terminally reactive groups per molecule. While the preponderance of the polymer molecules in the total polymeric composition are polyfunctional, it should be understood that some mono- or nonfunctional molecules can also be present in small amounts. Minute amounts of moisture in the terminating agent will tend to reduce the number of polyfunctional molecules. As an illustration, a polymeric composition in which there is an average of 1.5 to 2.5 functional terminal groups per molecule can be characterized as a telechelic polymer having about 2 terminally reactive groups per molecule.

The semi-telechelic polymer prepared with the monoalkali metal organo initiator is reacted in the same way to replace the single terminal alkali metal atom with a single functional group. It is preferred that the functional group added to the plasticizer be the same functional group as that added to the telechelic polymer with which it is to be mixed. For example, if a carboxy group is added to the telechelic polymer it is preferred that this polymer be plasticized with a carboxy semi-telechelic polymer. The plasticizer can contain a different functional group, such as another acidic group, so long as the reactive group on the end of the plasticizer molecule is reactive with the polyfunctional coupling agent used to cure the telechelic polymer. This common reactivity is essential and the degree of reactivity of the functional groups on both the telechelic polymer and the semi-telechelic polymer should be approximately the same. For this reason it is preferred that these reactive groups be the same.

The telechelic polymers thus plasticized can be mixed with fillers and cured with any curative known to react with the reactive groups of both telechelic and semi-telechelic polymers. For example, with polymers containing terminal acidic groups such as carboxy groups, the curatives found to be most effective are the aziridinyl compounds such as the triaziridinyl phosphine oxides or sulfides or the multi-functional aziridinyl-substituted triazines or triphosphatriazines. By "polyfunctional" we mean containing 3 or more functional groups per molecule. In general, polyfunctional alcohols, acids, halides, amines, ketones, triisocyanates, epoxides, and the like, can be employed. The organic radicals of the organo polyfunctional compounds are preferably selected from aliphatic, cycloaliphatic or aromatic hydrocarbon radicals containing anywhere from 1 to 36 carbon atoms.

Conventional curing agents can be employed as auxiliary curatives, for example, those curatives known to react by crosslinking across the double bonds of the diene polymer. Examples of such conventional curatives include sulfur, and sulfur compounds, peroxides, such as benzoyl peroxide and dicumyl peroxide and the like. Radiation such as ultraviolet or ionizing radiation can also be employed to bring about the curing reaction. Curing time and temperature can vary broadly, for example, from about 5 minutes to 100 hours or more between −100 to 500° F., preferably about 100 to 350° F.

Examples of polyfunction organic coupling agents include glycerol, 1,2,3-trihydroxybutane, erythritol, mannitol, gallic acid, hemimellitic acid, trimeric acid, mellitic acid, pyromellitic dianhydride, triethylenetetramine, tetraethylenepentamine, 1,3,5-trichlorobenzene, 1,2,4-trichlorobutane, benzine-1,3,5-triisocyanate, polyarylpolyisocyanate having an average of 3 isocyanate groups per molecule and a molecular weight of about 380, 2,4,6-heptanetrione, 1,4,9,10-anthracenetetrone, and the like.

Although polyfunctional coupling agents are preferred the invention can be practiced with difunctional curatives, particularly where a reactive group is formed or remains at the site of coupling to permit further chain extension or crosslinking after reaction involving a semi-telechelic molecule. This applies to the aziridinyl compounds which react with the acidic groups of the polymer and form an amine at the coupling site which can then become involved in further coupling reactions.

In a preferred aspect of our invention acidic telechelic polymers, and most preferably carboxy telechelic polymers which have been plasticized with an acidic or carboxy semi-telechelic polymer, are cured by coupling reactions with the polyaziridinyl compounds. The triaziridinyl phosphine oxides or sulfides are typical of compounds used in this type of curing reaction and these are represented by the formula:

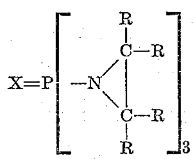

wherein X is selected from the group consisting of oxygen and sulfur, P is phosphorus, and each R is a radical selected from the group consisting of hydrogen, alkyl, cycloalkyl and aryl radicals and composites thereof such as alkaryl, aralkyl and the like and the total R's of each aziridinyl group containing up to a total of 20 carbon atoms. Specific phosphine oxide and sulfide reactants which can be used include:

tri(1-aziridinyl)phosphine oxide,
tri(2-methyl-1-aziridinyl)phosphine oxide,
tri(2,2-dimethyl-1-aziridinyl)phosphine oxide,
tri(2-methyl 3 ethyl-1-aziridinyl)phosphine oxide,
tri(2-ethyl-3-decyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-phenyl-1-aziridinyl)phosphine oxide,
tri[2-ethyl-3-(1-naphthyl)1-aziridinyl]phosphine oxide,
tri(2-nonyl-3-benzyl-1-aziridinyl)phosphine oxide,
tri[2-n-propyl-3-(2-phenylethyl)1-aziridinyl]-phosphine oxide,
tri[2-heptyl-3-(2,4-dimethylphenyl)1-aziridinyl]-phosphine oxide,
tri(2-methyl-1-aziridinyl)phosphine sulfide,
tri(2-methyl-3-cyclohexyl-1-aziridinyl)phosphine sulfide,
tri(2-phenyl-1-aziridinyl)phosphine sulfide, and
tri(2-amyl-3-benzyl-1-aziridinyl)phosphine sulfide.

Examples of other polyfunctional aziridinyl compounds are the aziridinyl-substituted triazines and triphosphatriazines, for example, the 1-aziridinyl-1,3,5-triazines and the 1-aziridinyl-2,4,6-triphospha-1,3,5-triazines represented by the formulas:

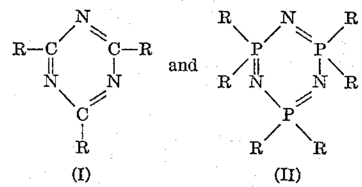

wherein each R is a radical at least two of which in each formula are 1-aziridinyl radicals as defined above for the phosphine oxides and sulfides and the remainder are selected from the group consisting of said 1-aziridinyl radicals, hydrogen, alkyl, cycloalkyl and aryl radicals and compositions thereof, each hydrocarbon radical containing from 1 to 12 carbon atoms.

Examples of compounds represented by Formula I include the following:

2,4-di(1-aziridinyl)1,3,5-triazine,
2-methyl-4,6-di(1-aziridinyl)1,3,5-triazine,
2,4,6-tri(1-aziridinyl)1,3,5-triazine,
2,4,6-tri(2-methyl-1-aziridinyl)1,3,5-triazine,
2,4,6-tri(2-methyl-3-ethyl-1-aziridinyl)1,3,5-triazine,
2,4,6-tri(2-ethyl-3-octadecyl-1-aziridinyl)1,3,5-triazine,
2,4,6-tri(2-methyl-3-cyclopentyl-1-aziridinyl)1,3,5-triazine,
2,4,6-tri(2-phenyl-1-aziridinyl)1,3,5-triazine,
2,4,6-tri(2,3-diphenyl-1-aziridinyl)1,3,5-triazine,
2,4,6-tri(2-n-propyl-3-(2-phenylethyl)1-aziridinyl)-1,3,5-triazine,
2,4,6-tri(2-methyl-3-(4-methylphenyl)1-aziridinyl)-1,3,5-triazine and the like.

Examples of compounds represented by Formula II are:

2,4-di(1-aziridinyl)2,4,6-triphospha-1,3,5-triazine,
2,4,6-tri(1-aziridinyl)2,4,6-triphospha-1,3,5-triazine,
2,4,6-tri(2-methyl-3-n-butyl-1-aziridinyl)2,4,6-triphospha-1,3,5-triazine,
2,4,6-tri(2-ethyl-3-cyclohexyl-1-aziridinyl)2,4,6-triphospha-1,3,5-triazine,
2,4,6-tri(2-n-propyl-3-(2-phenylethyl)1-aziridinyl)-2,4,6-triphospha-1,3,5-triazine,
2,4,6-tri(2-heptyl-3-(2,4-dimethylphenyl)1-aziridinyl)-2,4,6-triphospha-1,3,5-triazine,
2,2,4,4,6,6-hexa(2-methyl-1-aziridinyl)2,4,6-triphospha-1,3,5-triazine, hereinafter referred to as hexa-2-methyl-1-aziridinyl-triphosphatriazine, 2,2,4,6-tetra(2-hexyl-1-aziridinyl)-2,4,6-triphospha-1,3,5-triazine and the like.

Other difunctional aziridinyl compounds which can be employed are defined by the formula:

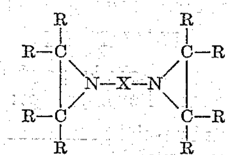

wherein X is selected from the group consisting of carbonyl, phenyl phosphoryl, phenyl thiophosphoryl, sulfoxyl or sulfonyl and each R is as defined above for the aziridinyl radical of the phosphine oxides. In a preferred species X is phenyl phosphoryl or sulfoxyl attached to (2-methyl-1-aziridinyl) groups. Examples of these difunctional aziridinyl compounds are:

phenyl-bis(2-methyl-1-aziridiny)phosphine sulfide,
phenyl-bis(2-methyl-1-aziridinyl)phosphine oxide,
phenyl bis(2-ethyl-1-aziridinyl)phosphine oxide,
phenyl-bis(2-methyl-3-ethyl-1-aziridinyl)phosphine oxide,
phenyl-bis(2-butyl-1-aziridinyl)phosphine oxide, bis(2-methyl-1-aziridinyl)sulfoxide,
bis(2-propyl-1-aziridinyl)sulfoxide,
bis(2-methyl-3-propyl-1-aziridinyl)sulfoxide,
(2-methyl-1-aziridinyl-2-butyl-1-aziridinyl)sulfoxide,
bis(1-aziridinyl)sulfone,
bis(2-methyl-1-aziridinyl)sulfone,
bis(2-ethyl-1-aziridinyl)sulfone,
bis(2-propyl-1-aziridinyl)sulfone,
bis(2-ethyl-3-propyl-1-aziridinyl)sulfone,
(2-methyl-1-aziridinyl-2-ethyl-1-aziridinyl)sulfone,
bis(1,2-propylene)-1,3-urea,
bis(1,2-pentylene)-1,3-urea,
bis(4,5-octylene)-1,3-urea and the like. Other difunctional compounds can be used such as ethylene or diethylene glycol bis(1,2-propylene)-carboxamides, di-1(2-methyl-1-aziridinyl)propanol-2, bis(1,2-propylene)adipamide, bis(1,2-propylene)benzene-m-disulfonamide, bis(1,2-propylene)terephthalamide and the like.

Examples of other tri-functional organic coupling agents are polyepoxy compounds, such as those which contain at least oxirane groups

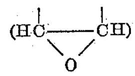

these groups being units in an open chain hydrocarbon chain or as branches therefrom. Examples of such compounds are triepoxyhexane, triepoxydecane, 2,3- 6,7- 11,12-triepoxydodecane, 2,3- 5,6-diepoxy-9-epoxy ethyldodecane, pentaepoxyeicosane, 2,3- 5-triepoxy ethyl-9,10-epoxyhexadecane, and the like. In these compounds the percent epoxy oxygen will usually exceed 0.5 percent and will preferably be in the range of from 2 to 12 percent or higher. A particularly useful compound of this class is a liquid epoxidized polybutadiene containing 3 or more epoxy groups per molecule. These materials which comprise a preferred species can be prepared by treating a liquid polymer of butadiene with a peracid, such as performic or peracetic acid. Rubbery solids can be prepared using from 1 to 10 equivalents of the epoxy compound based on equivalents of the epoxy groups present per carboxy group equivalent present in the carboxy terminated polymers.

A wide variety of products can be produced according to the method of this invention. Compounds such as potting compounds and caulking compounds, molded items, various laminated structures, and binders for various types of solids can be made. Since the polymers can be quite fluid in the uncured state many fabrication problems ordinarily attending the manufacture of rubbery products are absent. In order to illustrate further the advantages of our invention the following examples are presented. The proportions and conditions in these examples are given as being typical only and should not be construed to limit our invention unduly.

EXAMPLE I

A liquid carboxy telechelic polybutadiene was prepared according to the following recipe:

| | |
|---|---|
| 1,3-butadiene, parts by weight | 100 |
| Cyclohexane, parts by weight | 1000 |
| Lithium-methylnaphthalene-isoprene initiator, millimoles | 20 |
| Temperature, ° F. | 122 |
| Time, hours | 1.5 |
| Conversion | quantitative |

The initiator had been prepared by reacting isoprene, methylnaphthalene (a commercial mixture af alpha- and beta-methylnaphthalenes), and lithium in ether using the following proportions of ingredients:

| | |
|---|---|
| Methylnaphthalene, grams | 14.2 (14.2 ml.). |
| Isoprene, grams | 6.6 (10.0 ml.). |
| Lithium wire, grams | 2.2. |
| Diethyl ether, ml. | 47.2. |
| Temperature, ° F. | —15. |
| Time, hours | 40. |

To the reaction mixture was added 4 miles of butadiene per mole of initiator to effect solubilization. The amount of butadiene was calculated from the normality of the reaction mixture which was determined by withdrawing a sample and titrating it with 0.1 N hydrochloric acid.

Immediately following the polymerization the unquenched reaction mixture was carbonated using a T-tube. Carbon dioxide, under a pressure of 15–18 p.s.i.g., and the polymer solution were fed into separate arms of the tube where they were mixed. The carbonated polymer solution was acidified with a hydrochloric acid-isopropyl alcohol mixture and washed with water until neutral. The major portion of the solvent was removed under vacuum and the remainder by purging with nitrogen.

Four different plasticizers (A–D) were prepared according to the following recipes. Two of these plasticizers, B and D, were carbonated to form semitelechelic polymers whereas the other two plasticizers, A and C, were recovered by quenching with a hydrochloric acid-isopropyl alcohol mixture to form a nonfunctional polymer.

The polymerization recipe for plasticizers A and B was as follows:

| | |
|---|---|
| 1,3-butadiene, parts by weight | 100 |
| Cyclohexane, parts by weight | 780 |
| n-Butyllithium, millimoles | 40 |
| Temperature, ° F. | 122 |
| Time, hours | 4 |
| Conversion | quantitative |

Two runs were made. The first designated as plasticizer A, was not carbonated. The unquenched reaction mixture was treated with a hydrochloric acid-isopropyl alcohol mixture, washed with water until neutral, and the solvent removed as described for the above carboxy-telechelic polymer.

The polymer from the second run, designated as plasticizer B was carbonated and the polymer recovered as described above.

The polymerization recipe for plasticizers C and D was as follows:

| | |
|---|---|
| 1,3-butadiene, parts by weight | 100 |
| Cyclohexane, parts by weight | 1000 |
| n-Butyllithium, millimoles | 40 |
| Tetrahydrofuran, parts by weight | 5 |
| Temperature, ° F. | 86 |
| Time, hours | 1.5 |
| Conversion | quantitative |

Two runs were made as before and the polymer from the second run was carbonated as hereinbefore described to form plasticizer D. Both products were recovered as described above.

Microstructures, carboxy contents and viscosities (Brookfield viscosity at 77° F.) for the polymers from the foregoing runs were as follows:

| Run | Microstructure, percent | | Brookfield | COOH, percent |
|---|---|---|---|---|
| | Trans | Vinyl | Visc. at 77° F. | |
| Carboxy-telechelic polymer | 41.5 | 26.2 | 580 | 1.25 |
| Plasticizer A | 50.9 | 7.1 | 14 | ---------- |
| Plasticizer B | 53.1 | 7.6 | 30 | 1.28 |
| Plasticizer C | 20.9 | 61.4 | 49 | ---------- |
| Plasticizer D | 18.9 | 59.7 | 136 | 1.55 |

Microstructures in the above polymers were determined by infrared analysis according to the following procedure.

The polymer samples were dissolved in carbon disulfide so as to form a solution having 25 grams polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction ($\log I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

Blends of 80 parts by weight of the liquid carboxy telechelic polybutadiene were made with 20 parts by weight of each of the liquid monocarboxy and non-functional polybutadiene plasticizers A–D and cured using 1.5 equivalents of tri(2-methyl-1-aziridinyl)phosphine oxide based upon the carboxy content of each composition. Samples were cured and treated with n-heptane 3 hours at 60° C. and then 3 hours at 30° C. and extractable material determined. A control was run using the liquid carboxy telechelic polybutadiene alone. These runs are summarized in the following table.

*Table I*

16 HOUR CURE AS 200° F.

| Plasticizer | Vr* | Percent Extractable |
|---|---|---|
| None | 0.219 | 2.7 |
| A—non-functional | 0.167 | 17.9 |
| B—mono-functional | 0.152 | 9.3 |
| C—non-functional | 0.166 | 19.8 |
| D—mono-functional | 0.131 | 12.0 |
| 96 HOUR CURE AT 200° F. | | |
| None | 0.331 | 1.7 |
| A—non-functional | 0.272 | 10.0 |
| B—mono-functional | 0.278 | 4.3 |
| C—non-functional | 0.284 | 10.8 |
| D—mono-functional | 0.265 | 5.1 |

*Vr is the inverse swelling ratio of the cured polymer in n-heptane and is an indication of the degree of cure of the polymer. It is obtained by dividing the volume of dry polymer by the combined volume of polymer and imbibed solvent.

The results show that after 16 hours' cure the greater part of the non-functional polymer was extractable whereas much less of the mono-functional polymer could be removed. Extractable matter in all compositions decreased at the higher level but was much less in the compositions containing the mono-functional polymer than in those which were plasticized with the non-functional material.

EXAMPLE II

The liquid carboxy telechelic polybutadiene in Example I and an 80/20 blend of this polymer with plasticizer B were each compounded with 1.5 equivalents of tri(2-methyl-1-aziridinyl)phosphine oxide, based on the carboxy contents of the compositions, and 250 parts by weight per 100 parts polymer of finely ground naturally occurring calcium carbonate (Whiting). The stocks were cured 96 hours at 200° F. and elongation at −90° F. was determined on a cured specimen. The elongation of the carboxy telechelic polymer without plasticizer was 40 percent at −90° F. whereas the elongation of this polymer with the plasticizer was 60 percent. It is apparent that a substantial improvement in the low temperature properties of such a polymer can be obtained by using a mono-functional plasticizer.

As will be apparent to those skilled in the art various modifications can be made in our invention without departing from the spirit and scope thereof.

We claim:

1. A method of making a polymeric product which comprises mixing a first polymer of vinylidene-containing monomers selected from the group consisting of conjugated dienes having 4 to 12 carbon atoms per molecule and vinyl-substituted aromatic compounds, said first polymer containing at least about 2 terminal functional groups per molecule, with a second polymer of a conjugated diene having 4 to 8 carbon atoms per molecule, said second polymer containing only 1 terminal functional group per molecule, and reacting the resulting mixture with an organic compound containing at least 2 functional groups about equally reactive with said functional groups on said first and second polymer.

2. A method of making a polymeric product which comprises plasticizing a first polymer of a conjugated diene having 4 to 12 carbon atoms per molecule, said first polymer containing at least about 2 terminally reactive groups per molecule, with a less viscous second polymer of a conjugated diene having 4 to 8 carbon atoms per molecule, said second polymer having only 1 terminally reactive group per molecule, and curing the resulting mixture by reacting said terminally reactive groups on said first and second polymers with a polyfunctional organic compound containing at least 3 functional groups.

3. The method of claim 2 wherein said terminally reactive groups on said first and second polymers are acidic groups and said polyfunctional organic compound is a polyaziridinyl compound.

4. The method of claim 2 wherein from 25 to 95 parts of said first polymer and from 5 to 75 parts of said second polymer are mixed to form 100 parts by weight of polymeric mixture.

5. The method of claim 2 wherein said reactive groups on said first and second polymers are carboxy groups and said polyfunctional organic compound is a triaziridinyl phosphine compound.

6. A method of making a polymeric product which comprises plasticizing about 75 to 95 parts by weight of a first polymer of 1,3-butadiene having about 2 terminal carboxy groups per molecule with about 5 to 25 parts of a less viscous second polymer of 1,3-butadiene having a single terminal carboxy group per molecule and a viscosity at 77° F. in the range of about 10 to 500 poises and curing the resulting mixture by reacting the carboxy groups of said first and second polymers with a triaziridinyl phosphine compound.

7. The method of claim 6 wherein said first and second polymers are homopolymers of 1,3-butadiene.

8. The method of claim 6 wherein said first polymer is a copolymer of 1,3-butadiene and styrene with the diene in major amount and said second polymer is a homopolymer of 1,3-butadiene.

9. The method of claim 6 wherein said triaziridinyl compound is tri(2-methyl-1-aziridinyl)phosphine oxide.

10. The polymeric product prepared by the method of claim 1.

11. The polymeric product prepared by the method of claim 9.

12. The method of claim 9 wherein said first polymer has a viscosity of about 500 to 3000 poises at 77° F. and said second polymer has a viscosity of about 20 to 400 poises at 77° F.

References Cited in the file of this patent

UNITED STATES PATENTS

| | | |
|---|---|---|
| 2,638,460 | Crouch | May 12, 1953 |
| 2,662,874 | Brown | Dec. 15, 1953 |
| 2,906,592 | Reeves et al. | Sept. 29, 1959 |
| 2,915,480 | Reeves | Dec. 1, 1959 |
| 2,978,393 | Hach et al. | Apr. 4, 1961 |